(12) United States Patent
Doane et al.

(10) Patent No.: US 6,800,712 B2
(45) Date of Patent: Oct. 5, 2004

(54) STARCH GRAFT COPOLYMERS AND METHOD OF MAKING AND USING STARCH GRAFT COPOLYMERS FOR AGRICULTURE

(76) Inventors: Steven William Doane, 448 S. Montana Ave., Morton, IL (US) 61550; William McKee Doane, 448 S. Montana Ave., Morton, IL (US) 61550

( * ) Notice: Subject to any disclaimer, the term of this patent is extended or adjusted under 35 U.S.C. 154(b) by 0 days.

(21) Appl. No.: 10/265,500

(22) Filed: Oct. 7, 2002

(65) Prior Publication Data

US 2004/0068073 A1 Apr. 8, 2004

(51) Int. Cl.$^7$ .......................... C08H 5/04; C09D 103/04
(52) U.S. Cl. ...................... 527/312; 527/103; 106/31.71
(58) Field of Search ................................ 527/103, 312; 106/31.71

(56) References Cited

U.S. PATENT DOCUMENTS

| | | |
|---|---|---|
| 3,935,099 A | 1/1976 | Weaver et al. |
| 3,981,100 A | 9/1976 | Weaver et al. |
| 3,985,616 A | 10/1976 | Weaver et al. |
| 3,997,484 A | 12/1976 | Weaver et al. |
| 4,045,387 A | 8/1977 | Fanta et al. |
| 4,076,663 A | 2/1978 | Masuda et al. ...... 260/17.4 GC |
| 4,134,863 A | 1/1979 | Fanta et al. |
| 4,194,998 A | 3/1980 | Fanta et al. .......... 260/17.4 GC |
| 4,483,950 A | 11/1984 | Fanta et al. ................... 524/48 |

OTHER PUBLICATIONS

D. Trimnell et al., *Graft Polymerization of Methyl Acrylate onto Granular Starch: Comparison of the $Fe+2/H_2O_2$ and Ceric Initiating Systems*, 60 J. Applied Polymer Sci. 285 (1996).

George F. Fanta, *Starch Graft Copolymers*, in 10 Polymeric Materials Encyclopedia 7901 (Joseph C. Salamone ed., 1996).

George F. Fanta et al., Note, *Graft Polymerization of Methyl Acrylate—Vinyl Acetate Mixtures onto Starch*, 49 J. Applied Polymer Sci. 1679 (1993).

George F. Fanta et al., *Factors Influencing Absorbent Properties of Saponified Starch–g–Polyacrylonitrile Isolated by Methanol Precipitation*, 36 Starch/Stärke 416 (1984).

George F. Fanta et al., *Polysaccharide–g–Polystyrene Copolymers by Persulfate Initiation: Preparation and Properties*, 28 J. Applied Polymer Sci. 2455 (1983).

George F. Fanta & William M. Doane, Saponified Starch––g–Polyacrylonitrile and Related Absorbents at 26, fig. 1 (Aug. 27, 1981) (unpublished manuscript, on file with Northern Regional Research Center, Agricultural Research Service, U.S. Department of Agriculture, Peoria, Illinois 61604).

Weaver, Montgomery, Miller, Sohns, Fanta, Doane A Practical Process For The Preparation of Super Slurper, a Starch––Based Polymer With A Large Capacity To Absorb Water Starke vol. 29, 1977 12 pp. 413–422.

Fanta, Burr, Doane Factors Influencing Absorbent Properties Of Saponified Starch–g–Polyacrylonitrile Isolated by Methanol Precipitation Starke vol. 36, 1984 12 pp. 416–419.

Fanta Starch Graft Copolymers CRC Press, 1996 pp. 7901–7910.

"Absorbent Polymers from Starch and Flour Through Graft Polymerization of Acrylonitrile and Comonomer Mixtures," by G. F. Fanta, R. C. Burr, W. M. Doane, and C. R. Russell, *Northern Regional Research Laboratory, Agricultural Research Service, U.S. Department of Agriculture, Peoria, Illinois 61604;* Starch/Stärke 30 (1978) Nr. 7, S. 237–242.

"Swelling and Rheology of Saponified Starch–g–Polyacrylonitrile Copolymers, Effect of Starch Granule Pretreatment and Grafted Chain Length," by N. W. Taylor, G. F. Fanta, W. M. Doane, and C. R. Russell, *Northern Regional Research Center. Agricultural Research Service, U.S. Department of Agriculture, Peoria, Illinois 61604;* Journal of Applied Polymer Science, vol. 22, 1343–1357 (1978).

"A Practical Process for the Preparation of Super Slurper, a Starch–Based Polymer with a Large Capacity to Absorb Water," by M. O. Weaver, R. R. Montgomery, L. D. Miller, V. E. Sohns, G. F. Fanta, and W. M. Doane, *Northern Regional Research Center. Agricultural Research Service, U.S. Department of Agriculture, Peoria, Illinois 61604* (USA); Die Stärke 29, Jahrg. 1977/Nr. 12, S. 410–413.

"Graft Copolymers of Starch–Polyacrylonitrile Prepared by Ferrous Ion–Hydrogen Peroxide Initiation," by Edward I. Stout, Donald Trimnell, William M. Doane, and Charles R. Russell, *Northern Regional Research Center, Agricultural Research Service, U.S. Department of Agriculture, Peoria, Illinois 61604;* Journal of Applied Polymer Science, vol. 21, 2565–2573 (1977).

"Rheology of a Cellulose Graft Copolymer. Comparison with Other Closely Packed Gel Thickeners," by W. Taylor and E. B. Bagley, *Northern Regional Research Laboratory, Agricultural Research Service, Peoria, Illinois 61604;* Journal of Applied Polymer Science, vol. 21, 1607–1613 (1977).

"Tailoring Closely Packed Gel–Particle Systems for Use as Thickening Agents," by N. W. Taylor and E. B. Bagley. *Northern Regional Research Laboratory, Agricultural Research Service. U.S. Department of Agriculture, Peoria, Illinois 61604;* Journal of Applied Polymer Science, vol. 21, 113–122 (1977).

(List continued on next page.)

Primary Examiner—James L. Seidleck
Assistant Examiner—Thoa Tran
(74) Attorney, Agent, or Firm—Stoel Rives LLP

(57) ABSTRACT

Methods of making and using starch graft copolymers produce particle sizes useful in granule applicators for applying to agricultural fields. Starch graft copolymers on field crops provide excellent anti-crusting properties, increased seed germination and stand, increased crop growth, increased crop yields and reduced water requirements.

6 Claims, No Drawings

OTHER PUBLICATIONS

"Rheology of Dispersions of Swollen Gel Particles ," by N. W. Taylor and E. B. Bagley, *Northern Regional Research Laboratory, Agricultural Research Service, U.S. Department of Agricultural, Peoria, Illinois 61604;* Journal of Polymer Science: Polymer Physics Edition; vol. 13, 1133–1144 (1975).

"Starch–Polyacrylonitrile Copolymers. Properties by Hydrogels," by E. B. Bagley and N. W. Taylor, *Northern Regional Research Laboratory, Agricultural Research Service, U.S. Department of Agriculture, Peoria, Illinois 61604;* I&EC Product Research & Development, vol. 14, Page 105, June 1975.

"Common Slurper Compound with a Super Thirst," reprinted from Agricultural Research, June 1975; published by the Agricultural Research Service, U.S. Department of Agriculture.

"A Polymeric Absorbent Seeks Problems to Solve," by George F. Fanta, M. Ollidene Weaver, and William M. Doane, *Northern Regional Research Laboratory, Agricultural Research Service, U.S. Department of Agriculture, Peoria, Illinois 61604;;* reprinted from Chemical Technology, vol. 4, November 1974, pp. 675–676.

"Dispersions or Solutions? A Mechanism for Certain Thickening Agents," by N. W. Taylor and E. B. Bagley, *Northern Regional Research Laboratory, Agricultural Research Service, U.S. Department of Agriculture, Peoria, Illinois 61604;* Journal of Applied Polymer Science, vol. 18, pp. 2747–2761 (1974).

"Gel Sheets Produced by Hydration of Films from the Potassium Salt of Hydrolyzed Starch–Polyacrylonitrile Graft Copolymer," by M. O. Weaver, E. B. Bagley, G. F. Fanta, and W. M. Doane, *Northern Regional Research Laboratory, Agricultural Research Service, U.S. Department of Agriculture, Peoria, Illinois 61604;* Applied Polymer Symposium No. 25, 97–102 (1974).

"Hydrolyzed Starch–Polyacrylonitrile Graft Copolymer Solutions: Effect of Shear History on Transient and Steady–State Viscoelastic Behavior," by E. B. Bailey and N. W. Taylor; *Northern Regional Research Laboratory, Agricultural Research Service, U.S. Department of Agriculture, Peoria, Illinois 61604;* J. Polymer Sci.: Symposium No. 45, 185–196 (1975).

"Kinetics of Grafting Acrylonitrile onto Starch," by L. A. Gugliemelli, C. L. Swanson, and W. M. Doane, *Northern Regional Research Laboratory, Agricultural Research Service, U.S. Department of Agriculture, Peoria, Illinois 61604;* Journal of Polymer Science: Polymer Chemistry Edition, vol. 11, 2451–2462 (1973).

"Continuous Production of Acrylonitrile–Starch Graft Copolymers by Ceric Ion Catalysis," by Zoila Reyes, Carroll F. Clark, Frederick Dreier, and Russell C. Phillips, *Stanford Research Institute, Menlo Park, Calif. 94025;* and C. R. Russell and C. E. Rist, *Northern Regional Research Laboratory, Abricultural Research Service. U.S. Department of Agricultural, Peoria, Illinois; 61604;* reprinted from I&EC Process Design & Development, vol. 12, Page 62, January 1973.

"Polyacrylonitrile Distribution in Grafted Starch Granules Determined by Scanning Electron Microscopy," by George F. Fanta, F. L. Baker, Robert C. Burr, W. M. Doane, and C. R. Russell, Peoria, Illinois (USA); Die Stärke 25, Jahrg. 1973/Nr. 5, S. 157–161.

"Starch–Cerium(IV) Complexes in Aqueous Media: Formation, Isolation, and Stability," by L. A. Gugliemelli, W. M. Doane, C. R. Russell, and C. L. Swanson, *Northern Regional Laboratory, Agricultural Research Service. U.S. Department of Agriculture, Peoria, Illinois 61604;* Polymer Letters, vol. 10, pp. 415–421 (1972).

"Hydrolyzed Starch–Polyacrylonitrile Graft Copolymers: Effect of Structure on Properties," by M. O. Weaver, L. A. Gugliemelli, W. M. Doane, and C. R. Russell, *Northern Regional Research Laboratory, Northern Marketing and Nutrition Research Division,, Agricultural Research Services, U.S. Department of Agriculture, Peoria, Illinois 61604;* Journal of Applied Polymer Science, vol. 15, pp. 3015–3024 (1971).

"Molecular Weight Distribution of the Polyacrylonitrile Moiety of Starch–Polyacrylonitrile Graft Copolymers," by L. A. Gugliemelli, M. O. Weaver, C. R. Russell, and C. E. Rist, *Northern Regional Research Laboratory, Agricultural Research Service, U.S. Department of Agriculture, Peoria, Illinois 61604;* Polymer Letters, vol. 9, pp. 151–155 (1971).

"Rheological Method of Investigating Reaction between Cerium(IV) and Starch," by L. A. Gugliemelli, M. O. Weaver and C. R. Russell, *Northern Regional Research Laboratory, Agricultural Research Service, U.S. Department of Agriculture, Peoria, Illinois 61604;* Polymer Letters, vol. 9, pp. 711–716 (1971).

"Copolymers of Starch and Polyacrylonitrile. Influence of Granule Swelling on Copolymer Composition under Various Reaction Conditions," by George F. Fanta, Robert C. Burr, C. R. Russell, and C. E. Rist, *Northern Regional Research Laboratory, a laboratory of the Northern Utilization Research and Development Division, Agricultural Research Service, U.S. Department of Agriculture, Peoria, Illinois 61604;* J. Macromol. Sci.–Chem., A4(2), pp. 331–339 (1970).

"Modification of Wheat Starch by Initiating Systems Used for Graft Polymerization," by George F. Fanta, Robert C. Burr, C. R. Russell, and C. E. Rist, *Northern Regional Research Laboratory, a laboratory of the Northern Utilization Research and Development Division, Agricultural Research Service, U.S. Department of Agriculture, Peoria, Illinois 61604;* Reprinted from Cereal Chemistry, Jan., 1970, vol. 47, No. 1, pp. 85–91.

"Base–Hydrolyzed Starch–Polyacrylonitrile (S–PAN) Graft Copolymer. S–PAN–1:1, PAN M. W. 794,000," by L. A. Gugliemelli, M. O. Weaver, C. R. Russell, and C. E. Rist, *Northern Regional Research Laboratory, Northern Utilization Research and Development Division, Agricultural Research Service, U.S. Department of Agriculture, Peoria, Illinois 61604;* Journal of Applied Polymer Science, vol. 13, pp. 2007–2017 (1969).

"Copolymers of Modified Starches with Polyacrylonitrile," by George F. Fanta, Robert C. Burr, C. R. Russell, and C. E. Rist, *Northern Regional Research Laboratory, Northern Utilization Research and Development Division, Agricultural Research Service. U.S. Department of Agriculture, Peoria, Illinois 61604;* Journal of Polymer Science: Part A–1, vol. 7, pp. 1675–1681 (1969).

"Copolymers of Starch and Polyacrylonitrile: The Dilution Effect," by George F. Fanta, Robert C. Burr, C. R. Russell, and C. E. Rist, *Northern Regional Research Laboratory, Northern Utilization Research and Development Division, Agricultural Research Service, U.S. Department of Agriculture, Peoria, Illinois 61604;* Journal of Applied Science, vol. 13, pp. 133–140 (1969).

"Copolymers of Starch and Polyacrylonitrile: The Soluble Fraction," by George F. Fanta, Glen E. Babcock, and Robert C. Burr, *Northern Regional Research Laboratory, Northern Utilization Research and Development Division, Agricultural Research Service, U.S. Department of Agriculture, Peoria, Illinois 61604;* Journal of Polymer Science: Part A–1, vol. 7, pp. 980–982 (1969).

"Copolymers of When Starch and Polyacrylonitrile. Effect of Aqueous—Organic Solvent Systems on Copolymer Composition," by Robert C. Burr, George F. Fanta, C. R. Russell, and C. E. Rist, *Northern Regional Research Laboratory, a laboratory of the Northern Utilization Research and Development Division, Agricultural Research Service, U.S. Department of Agriculture, Peoria, Illinois 61604;* J. Macromol. Sci.—Chem., A2(1), pp. 93–101 (1968).

"Graft Copolymers of Starch. III. Copolymerization of Gelatinized Wheat Starch with Acrylonitrile. Influence of Chain Modifiers on Copolymer Composition," by George F. Fanta, Robert C. Burr, C. R. Russell, and C. E. Rist, *Northern Regional Research Laboratory, Northern Utilization Research and Development Division, Agricultural Research Service, U.S. Department of Agriculture, Peoria, Illinois 61604;* Journal of Applied Polymer Science, vol. 11, pp. 457–463 (1967).

"Influence of Swelling and Disruption of the Starch Granule on the Composition of the Starch–Polyacrylonitrile Copolymer," by Robert C. Burr, George F. Fanta, C. R. Russell, and C. E. Rist, *Northern Regional Research Laboratory, Agricultural Research Service, U.S. Department of Agriculture, Peoria, Illinois 61604;* J. Macromol. Sci.—Chem., A1(7), pp. 1381–1385, Nov., 1967.

"Graft Copolymers of Starch, I. Copolymerization of Gelatinized Wheat Starch with Acrylonitrile. Fractionation of Copolymer and Effect of Solvent on Copolymer Composition," by George F. Fanta, Robert C. Burr, C. R. Russell, and C. E. Rist, *Northern Regional Research Laboratory, Northern Utilization Research and Development Division, Agricultural Research Service, U.S. Department of Agriculture, Peoria, Illinois 61604;* Journal of Applied Polymer Science, vol. 10, pp. 929–937 (1966).

"Graft Copolymers of Starch. II. Copolymerization of Gelatinized Wheat Starch with Acrylonitrile Influence of Reaction Conditions on Copolymer Composition," by George F. Fanta, Robert C. Burr, C. R. Russell, and C. E. Rist, *Northern Regional Research Laboratory, Agricultural Research Service, U.S. Department of Agriculture, Peoria, Illinois 61604;* Polymer Letters, vol. 4, pp. 765–769 (1966).

STARCH GRAFT COPOLYMERS AND METHOD OF MAKING AND USING STARCH GRAFT COPOLYMERS FOR AGRICULTURE

BACKGROUND OF THE INVENTION

The U.S. Pat. Nos. 3,935,099, 3,981,100, 3,985,616 and 3,997,484 all issued in 1976 have been given credit for the materials referred to as super absorbent polymers. Since 1976, many inventors have been issued patents for super absorbent polymers (SAP). Most all of these patents claim compositions made by copolymerizing acrylic acid and acrylamide in the presence of a coupling agent. A few of these patents also include a natural polymer such as starch as claimed in U.S. Pat. Nos. 3,935,099, 3,981,100, 3,985, 616 and 3,997,484. The patents made without starch refer to their SAP as totally synthetic copolymers. Today the market for the totally synthetic copolymers, SAP, is estimated to be about 2 billion pounds per year worldwide. These SAPs are used almost totally in baby diapers, adult diapers, catamenials, hospital bed pads, cable coating and the like.

Starch graft copolymer compositions with the ability to absorb up to 1000 times their weight in aqueous fluids are known in the prior art. The prior art disclosed cross-linked starch-graft copolymers which absorb large quantities of aqueous fluids for use in absorbent softgoods, in increasing the water holding capacity of soils, and as coatings onto seeds, fibers, clays, paper and the like. The prior art also disclosed methods for drying the compositions to give films by drying in trays, or by heating on drum dryers. These films can then be ground or milled to give flakes or powders. An alternative method for drying was disclosed in the prior art where a viscous mixture of alkali starch-graft copolymer was diluted with a waster miscible organic solvent such as alcohol or acetone. The precipitated alkali starch graft copolymer was then isolated in a fine powder form by filtration and drying.

Surprisingly, agricultural companies that market seed, fertilizer, herbicides, insecticides and other agricultural materials, have found little use for the totally synthetic copolymers (SAPs) in agriculture. In evaluations of SAPs, the SAPs performed poorly and were of no interest to agricultural companies.

It is surprising that the application of starch-containing graft copolymers, made by the methods disclosed herein, directly to the soil resulted in earlier seed germination and/or blooming, decreased irrigation requirements, increased propagation, increased crop growth, increased crop production, and decreased soil crusting. Thus, starch graft copolymers made by the methods disclosed herein have great advantages to assist in agriculture practices and production.

Also surprising was that the prior art dried films or dried powders are not useful in broad scale agricultural applications since these powders are smaller, finer than 80 mesh, in particle size, and are limited to this particle size due to the ways in which these powders are produced. One inherent limitation with finer mesh particles is that they cannot be used in typical granule applicators. The films and powders would not be useful to apply with granule fertilizers, granule pesticides or other granule agricultural additives. In granule applicators, the particle size needs to be somewhat larger, at least about 25 mesh. The starch graft copolymer of this invention provides a commercially viable product for use in broadscale agricultural applications.

SUMMARY OF THE INVENTION

In one aspect of the invention, a first method of producing a starch graft copolymer for use in agricultural applications is disclosed. It includes the following steps: (a) providing grafting reactants and a starch; (b) graft polymerizing the grafting reactants onto the starch to form a starch graft copolymer; (c) saponifying the starch graft copolymer; (d) precipitating the starch graft copolymer; and (e) granularizing the starch graft copolymer to form particles.

A second method of producing a starch graft copolymer for use in agricultural applications is also disclosed. It includes the following steps: (a) providing grafting reactants and a starch; (b) graft polymerizing the grafting reactants onto the starch to form a starch graft copolymer; (c) saponifying the starch graft copolymer; (d) adding an acid to lower a pH of the starch graft copolymer to about between 2.0 and 3.5 to precipitate the starch graft copolymer to form a starch graft copolymer precipitant; (e) separating the starch graft copolymer precipitant; (f) neutralizing the pH of the starch graft copolymer precipitant to about between 6.0 and 8.0 to form a starch graft copolymer; and (g) granularizing the starch graft copolymer to form particles.

In another aspect of the invention, methods of using a starch graft copolymer produced by the two methods above, are disclosed to increase crop production. These methods of using include applying the granulated starch graft copolymer directly to the furrow, as well as coating a root or seed with the starch graft copolymer.

In another aspect of the invention, a starch graft copolymer for use in agricultural applications made in accordance with the two methods above is disclosed.

DETAILED DESCRIPTION OF THE INVENTION

The alkali starch graft copolymers of this invention are produced by graft polymerizing grafting reactants onto a starch. The grafting reactants of this invention include an acrylonitrile and an initiator. The starch may be selected from the group consisting of starches, flours, and meals. The preferred embodiment includes gelatinized cornstarch. The acrylonitrile may be used alone or in conjunction with other monomers commonly used in the industry. The preferred weight ratio of the starch to the acrylonitrile is in the range of about between 1:2 and 1:5. The acrylonitrile is graft polymerized onto starch in the presence of an initiator, preferably a cerium (+4) salt. The preferred initiator is cerium ammonium nitrate. However, other suitable initiator systems are known to those skilled in the art. The polymerization is accomplished in several minutes producing long grafted chains of polyacrylonitrile, or polyacrylonitrile with other monomers attached to the starch. This starch graft copolymer is then saponified with an alkali metal, preferably potassium hydroxide or sodium hydroxide, to change the nitrile groups into a mixture of carboxamides and alkali carboxylates.

The saponification step provides a highly viscous mass that must be isolated in a dry form for usage in agriculture. The resulting saponificate is then precipitated into a solid form and formed into the desired size particles. Formation of the starch-containing graft copolymers into particles of the desired size for direct use in agricultural equipment is achieved by converting the viscous mass of alkali starch-graft copolymers into rod-shaped forms and drying the forms to the desired particle size. Selecting an appropriate die can vary the rod-shaped forms. A plate is used that has been drilled or formed to contain holes of selected size and shape. Rod-shaped forms may be lightly coated, after the die, to reduce the tackiness of the rod-shaped forms. Clays, starches, flours and cellulose can be used to dust the rods.

There are two methods of making the starch-containing graft copolymers of this invention. In the first method, the starch-containing graft copolymer is prepared and rod shapes of the copolymer are formed from the viscous alkali starch graft copolymer. The isolated product is recovered from the viscous polymerization dough with the use of water miscible solvents such as alcohols. These include methanol, ethanol, propanol and isopropanol. Since methanol is generally the least expensive of the alcohols, it is often chosen and it is the preferred alcohol in this method. The resulting dough is then immersed into the alcohol, and the alkali starch graft copolymer is precipitated into particles that are then screened after drying to the desired size. The diameter of the rods is controlled by drilling holes in the end plate of $\frac{1}{16}$ inch to $\frac{1}{4}$ inch diameters. This first method of precipitation by the use of alcohols is very different from the second method of precipitation, which does not use alcohols for precipitation.

A second method of making the starch containing copolymers utilizes another method of precipitating the saponificate. The second method differs from the first method in that it utilizes an acid precipitation, which is then separated in some manner, and then neutralized to produce a viscous mass, which is then formed into rod-shaped particles and allowed to air or oven dry before screening or grinding and screening.

In the second method, after the starch graft copolymer is saponified according to the steps of the first method, the alkali starch graft copolymer is precipitated by adding acid until a pH of about between 2.0 and 3.5, more particularly about 3.0, is reached. The precipitate is washed with water to remove the salts, and if necessary, separated in some manner. Separating methods include settling, centrifuging, and other mechanical means of separating. The carboxylic acid of the starch graft copolymer is then titrated back to the alkali form with the hydroxide of an alkali metal, preferably potassium hydroxide, to a pH of about between 6.0 and 8.0, more particularly about 7.0. This viscous mass is then forced through a die plate; dusted to remove tackiness, and air or oven dried. The dried particles are then screened to the appropriate size. If desired, the particles could be ground to a fine particle then formed into pellets of the desired size for use in agriculture.

For both methods, the final product has a preferred particle size of less than about 200 mesh, depending upon the agricultural application. The preferred particle size for those agricultural applications which deposit the starch graft copolymer directly into the soil with the crop, is less than 50 mesh, more particularly in the range of 8 to 25 mesh. This particle size range is due to the commercially available granule applicators in the industry, which require this larger particle size for application. In order to broadcast or meter the absorbent particle through existing application equipment the 8 to 25 mesh product with a density of 30 to 35 pounds per cubic foot is preferred.

There are other agricultural applications that would use a finer particle size such as seed coating and root dipping. For seed coating, the particle size desired is about between 75 and 200 mesh, more particularly about 100 mesh. For root coating, the particle size desired is about between 30 and 100 mesh, more particularly about 50 mesh.

The results of the product produced by this invention will be demonstrated in the following examples and tables. Particle sizes between about 8 and 25 mesh were evaluated on cantaloupe, cotton and tomatoes with subsequent field evaluations of 40 additional crops. A few pounds/acre of the starch graft copolymer gave excellent results when used as an anti-crusting agent to prevent soil crusting. (See EXAMPLE 5b. and EXAMPLE 6a.) Soil crusting occurs from sprinkler irrigation. When placed on the soil surface prior to the planter press wheel, soil crusting was prevented.

With the starch graft copolymer added as an anti-crusting agent, tomato stand was significantly higher than with the untreated check rows. Tomatoes were also treated below the tomato seed at a 3 to 10 pound per acre rate. Tomato growth was significantly improved with the starch graft copolymer than with the untreated control rows. Tests on cantaloupe showed that the starch graft copolymer caused an earlier than expected blooming, required less irrigation water and gave a substantially greater melon yield of more uniform size and shape of melons that the untreated control group. Tests on cotton demonstrated the starch graft copolymer gave larger cotton plants, even though the cotton plants received one half the amount of water and still gave a 10% increase in cotton lint yield. Tests conducted on over 40 additional crop seeds showed no phytotoxicity from the starch graft copolymer.

In the prior art, the starches claimed were cornstarch, wheat starch, and sorghum starch. In the prior art, the absorbent starch or flour graft copolymers exhibited the ability to absorb a few hundred times to about 1000-times their weight in water. Several starches and flours not previously evaluated for their ability to form absorbent graft copolymers were analyzed and the results are published in TABLE 1. These products were corn meal, peeled yucca root, unpeeled yucca root, oat flour, banana flour and tapioca flour. Absorbent graft copolymers were made from these materials and the water absorbency of each was determined. The absorbent polymers were made with two polymerizable monomers, acrylonitrile and 2-acrylamido-2-methyl-propanesulfonic acid (AMPS) (See TABLE 1). Acrylic acid and acrylamide could also be used in place of AMPS.

Cornstarch graft copolymers made with various levels of acrylonitrile (AN), ceric ammonium nitrate (Ce) and saponified with either potassium hydroxide (KOH) or sodium hydroxide (NaOH) were evaluated also. Useful starches include, but are not limited to, cornstarch, wheat starch, sorghum starch, tapioca starch, cereal flours, and meals, banana flour, yucca flour, and pealed yucca roots. These starch sources are gelatinized to provide the best absorbency. The preferred weight ratio of starch to acrylonitrile is from 1:2 to 1:5. Often the more AN used gives somewhat higher absorbency in the isolated product. The absorbent products were isolated after alcohol precipitation and the absorbencies in the ranges of 400–500 grams of water per gram of polymer to 600–700 grams of water per gram of polymer were found (See TABLE 2).

In the prior art, methanol precipitation has been the solvent of choice to isolate the copolymer into a solid form. It acts to remove the water, desalt and granulize the neutralized alkali starch graft copolymer saponificate into particles. One way is to blend in sufficient methanol into the saponificate until a smooth dispersion is reached. Then the smooth dispersion is pumped into a precipitation tank consisting of a stirring system that can vigorously mix the methanol while pumping in the smooth saponificate dispersion. Once mixed, the resulting methanol and absorbent particles are collected by either (1) decanting or washing with methanol again; or (2) centrifuged and collected then dried to a moisture level about between 1 and 20 percent, more particularly about 10 percent. Although this precipitation method makes an extraneous salt free absorbent particle, there is a wide range of particle sizes formed with a majority of these particles finer than 60 mesh, TABLE 3, NP. These particles are too fine for most broad scale agricultural applications. The fine particles can be pelletized to provide a particle size that would be appropriate for agriculture to use, or they can be used for seed coating or root dipping.

There is another method to precipitate the absorbent polymer with methanol to produce larger particle sizes. The surface of the saponificate is wetted with a small amount of methanol and then chopped into larger "chunks" of saponificate that will not adhere back together. Once the surface of the saponificate is wetted with methanol the resulting material is slippery to the touch and is no longer sticky. About between 1 and 2 parts of methanol per 1 part of solids in the saponificate dough achieves this result.

Once this methanol is added the saponificate is either; (1) pumped through an in-line chopper to make chunks less than one inch in diameter or (2) in the laboratory it was hand chopped with scissors. The resulting mixture is then fed into a tank or waring blender that had about between 1.5 and 2.0 gallons of additional methanol per pound of saponificate solids. The methanol in the larger tank is agitated with a Cowles Dissolver or other mixers able to achieve high speeds. Using either: (1) precipitation and decanting techniques; or (2) centrifugation, the resulting particles were dried and sorted by particle sizes. This method produced particles that were much larger than the other means of particle size formation techniques. Typical results showed that using the "methanol chopping" method almost 65 percent of the particles formed were in the 8 to 25 mesh range, TABLE 3, MCM.

Using the experience gained in the methanol chopping method for particle size formation a third method of methanol precipitation was developed. This technique involves pre-forming the particle size diameter prior to methanol precipitation. The use of forming dies to form spaghetti strands of different shapes and diameters greatly improved the particle size formation. With this method one can predict the final particle size by the diameter of the spaghetti formed. The saponificate, neutralized or un-neutralized, is forced through a die plate with holes that varied in diameter from 1/16 of an inch to over 1/4 of an inch and of varying shapes for example, round-shaped, star-shaped, ribbons, etc. The method used to force the saponificate through the forming die plate ranged from a hand-operated plunger, screw fed, augured, or pumped or any other similar way to convey the saponificate. The resulting spaghetti strands were formed and allowed to enter into the precipitation tank without any further addition of methanol as a pre-mixing agent. However, wetting the spaghetti strands with methanol or dusting the spaghetti strands with clays or starch or other natural or synthetic polymers would prevent them from sticking together. The resulting spaghetti strands were precipitated with agitated methanol and removed from the tank and dried. Depending upon the diameter of the die plate orifice, the particles formed by this technique were of similar size and shape. Over 85% of the particles were of similar size with very few fines and overs produced, TABLE 3, EP. This method produces a very uniform product that would be used for the agricultural applications.

TABLE 3, MP, shows the results of a fourth method of methanol precipitation. This method included use of a moyno pump, with a variable pump speed, to pump the neutralized saponificate through a plastic pipe with a fixed end cap in which 1/8 inch holes were drilled. The holes can be of any number or pattern that is desired. In this test 50 holes were drilled in the plastic end cap. The end cap was placed several inches above the methanol precipitation tank filled with 50 gallons of agitated methanol. A cover was placed over the precipitation tank and the moyno pump was turned on and the saponificate was pumped through the pipe and forced through the die plate. To prevent the spaghetti strands from swelling after forming due to over pressure of the pump, the pump's speed was controlled to form spaghetti strands with little swelling. The formed spaghetti strands were immediately immersed in the agitated methanol. After methanol particle forming and the desalting of the polymer, the methanol was decanted off and the remaining polymer was dried to a 10% moisture level. The results of this method of particle size formation are very encouraging for commercial production. The target particle size is reported as 85% of 8 to 25 mesh particle size with just a small percentage of fines. If fines are desired for seed coating or root dipping, then a smaller diameter die plate needs to be used.

In TABLE 3, the dried polymers made by the above methods were passed through a screening system consisting of a 8 mesh screen, followed by a 25 mesh screen, followed by a 60 mesh screen, followed by a 100 mesh screen and a fines collection pan. Upon screening the dried polymer the different cuts were collected and weighed. The percentage of each cut was calculated and reported.

Since some producers of absorbent polymers may not want to use organic solvents such as alcohols to precipitate the copolymers, an alternative method to recover absorbent particles of the desired particle size is disclosed. This alternative method does not use methanol as the precipitating agent. In forming the starch-containing graft copolymer, the alkali saponified starch graft copolymer is produced at a pH of 10 to 12 and then an acid is added to adjust the pH to about between 2.0 and 3.5, more particularly about 3.0. Acids that may be used include inorganic acids such as hydrochloric acid, sulfuric acid or nitric acid, preferably hydrochloric acid. Organic acids such as acetic acid can also be used. This step replaces the alkali in the alkali carboxylate in the graft copolymer with a proton to yield a carboxylic acid in the starch graft copolymer. The alkali forms a salt with the acid added. If the acid is hydrochloric, then potassium chloride and sodium chloride are formed. Any ammonia that is not removed is converted to ammonia chloride if hydrochloric acid is used. This acid treatment of the graft copolymer causes the copolymer to precipitate. The precipitate is then separated by means known to those skilled in the art. Separation may be achieved by any mechanical means, such as settling, filtering, centrifuging, or other means to dispose of the supernatant. The starch graft polymer precipitate is again washed with additional water to remove more of the potassium, sodium or ammonia salts and the supernatant disposed. After most of the salts have been removed by the water washes, the precipitate is then treated with an inorganic base such as potassium hydroxide, sodium hydroxide or ammonium hydroxide. For agricultural uses, the base chosen is generally potassium hydroxide. Potassium hydroxide produces the potassium carboxylate on every carboxylic acid in the starch graft copolymer. A pH in the range of 6.0 to 8.0 is achieved upon adding potassium hydroxide. The potassium hydroxide treatment re-suspends the starch graft copolymer to form a highly viscous mass. In order to dry this mass a pasta maker was used to make rod-shaped extrudates. These extrudates were allowed to air or oven dry. Since the rod-shaped extrudates were sticky, dusting the rods just after they are formed with clay, starches, flours, celluloses, or celite at levels of just a few percent removed the stickiness. The dried rod-shape forms were ground to provide particles of various sizes. If desired, the fine particles could be formed into pellets to provide particles of the preferred size. Pelletizing is common in the polymer industry and known to those skilled in the art.

The initial agricultural tests were conducted using cantaloupe, cotton, and tomatoes with subsequent tests of over forty additional crops.

The Initial Test Methodology:

1. The trial area was pre-irrigated.
2. The plant seed was planted in furrow to moisture.
3. Granule starch graft copolymer treatments were applied in furrow with the seed using a microband, ground-driven granule applicator.
4. Each plant test included 3 plots with the granule starch graft copolymer applied at 7 pounds per acre (LB/a) in one plot, 4 LB/a in another plot, and a control plot.
5. The test bed plants were provided only 50% of the water normally required to grow plants.
6. Evaluations were made at 11, 18, 25, 33, 40, 54, 68, and 75 days.
7. Evaluations included measurements of plant height above the soil level, plant weight cut off at soil level, plant root weight from the cut plants, plant stem diameter, and plant stress level.
8. In the test results, the term "significant difference" was mathematically (statistically) defined.

Summary of the Test Results for Cantaloupe

The cantaloupe in the 7 LB/a plot had a significant increase in plant weight when compared to the control at the 18-day evaluation. Although not always a significant difference, the cantaloupe in the 7 LB/a plot had a greater root and plant weight, stem diameter and plant height at the 25-day evaluation. The cantaloupe in the 7 LB/a plot continued to show less stress and had a greater leaf water potential reading at the 49-day evaluation. The cantaloupe in the 7 LB/a plot began blooming 3 days prior to the control plants. There were considerably more cantaloupe melons harvested form the 7 LB/a plot, the melon weight was greater, and the melons were harvested earlier.

In summary, cantaloupe planted in soil treated with the granule starch graft copolymer (using one half the normal amount of water required to grown cantaloupe) produced larger, healthier cantaloupe that produced more melons, earlier, and at a greater weight than the control plot.

The same methodology was used for the test of the cotton with the exception that the evaluation was conducted at 11, 18, and 25 days; the test was terminated because the cantaloupe plants overgrew the cotton plants. The plots were again provided only one half of the water normally required to grow cotton. The cotton was planted at 1 to 1.5 inches below the surface because cotton will not emerge if planted at a greater planting depth.

Summary of the Test Results for Cotton

Although there was no significant difference in the early growth of the cotton plants, the cotton in the 7 LB/a plot showed better growth in plant height and weight as well as root development. There was a significant difference in the leaf water potential of the cotton planted in the 7 LB/a granule starch graft copolymer plot over the control plot in the 18-day evaluation.

The cotton in the 7 LB/a granule starch graft copolymer plot did indicate increased growth in root length, stem diameter, and plant weight as well as root weight at the 25 day evaluation although the difference was not statistically significant.

Cotton planted in the soil treated with granule starch graft copolymer (using one half the normal amount of water required to grow cotton plants) produced larger, healthier cotton than the control plot. At harvest the cotton lint yield increased from the control plot was 10% greater for the 7 LB/a application rate.

The test methodology for the tomato plants was different than the cotton and cantaloupe.

1. In the 7 LB/a granule starch graft copolymer plot, the granule starch graft copolymer was shanked into the bed approximately 2 inches below the seed.
2. In the 4 LB/a granule starch graft copolymer plot, the granule starch graft copolymer was applied as a surface application in front of the press wheel.
3. The tomato seeds were dry planted as in normal and then sprinkle irrigated to germinate the seed. One problem associated with sprinkle irrigating is that the soil surface crusts and the tomato seed cannot break through the crust.
4. In the tomato test, the plots were evaluated only at 7 days to ascertain the number of germinated seeds that had broken through the crust.

The Test Results of the Tomato Plants

There was a significant increase in the number of emerged tomato plants treated in the 4 LB/a granule starch graft copolymer plot where granule starch graft copolymer was applied at the surface. This application was specifically intended to evaluate the effect of granule starch graft copolymer on plant germination and on soil crusting. It was concluded that granule starch graft copolymer caused small craters in the soil surface, which enabled the tomato plants to emerge. Subsequent tests confirmed the granule starch graft copolymer functions as an extraordinary anti-crusting agent, which is an especially useful characteristic when planting high cost, bio-engineered seeds because this characteristic allows more seed to germinate.

In the second field test on the tomatoes, the tomato plants were allowed to go to harvest. Upon evaluation there was a significant improvement in standing row count with the granule starch graft copolymer treatments when applied over the seed row or as a side-dress treatment when compared to the untreated check. Knowing from an earlier field test that the effect of the granule starch graft copolymer on seed germination and on preventing soil crusting was highly positive, there was a significant increase in yield with the granule starch graft copolymer treated plants when compared to the control check plants. With granule starch graft copolymer applied over the top of the seed row as an anti-crusting agent, the 4 LB/a treatment yielded 38.7 tons per acre as compared to 15 tons per acre for the untreated control. Using granule starch graft copolymer applications as a side dressing below the seed row at the rate of 7 LB/a, yielded 39.3 tons per acre as compared to the control of 15 tons per acre. These higher yields were clearly validated by the initial field test on tomatoes to evaluate the effect of granule starch graft copolymer on plant germination and on soil crusting.

The following examples are intended only to further illustrate the invention and are not intended to limit the scope of the invention, which is defined by the claims.

EXAMPLE 1

In a 3-liter resin kettle 1400 ml of distilled water was charged and the stirrer was turned on. 110 grams of the flour or meal was slowly added and allowed to stir for 5 minutes. A slow stream of nitrogen gas was allowed to bubble into the mixture while the temperature was brought up to 95 degrees C. The mixture was held at that temperature for 45 minutes to insure complete gelatinization of the starch. The heating mantle was then removed and a cold water bucket bath put in its place. The mixture was continuously stirred under nitrogen until the temperature dropped to 25 degree C. Then 115 grams of acrylonitrile and 23 grams of 2-acrylamido-2-methyl-propanesulfonic acid (AMPS) was added and stirring continued under nitrogen for 10 minutes. A previously made catalyst solution of 5.5 grams of cerric ammonium nitrate dissolved in 50 ml of 0.1 normal nitric acid solution was added to the resin kettle. The cooling bucket was kept in place to control the exotherm while stirring for 60 minutes. The temperature of the grafting was recorded and the exotherm was kept below a 3 degree C. climb. The temperature of the mixture at the end of the 60 minutes was 40 degree C. After 60 minutes of stirring under nitrogen the nitrogen was removed and a solution made up of 90 gm of potassium hydroxide flakes in 200 grams of water was added to the resin kettle while stirring. The heating mantle was put back under the resin kettle and the mixture was heated to 95 degree C. and held there for 60 minutes. After 60 minutes the heating mantle was removed and the pH of the mixture was recorded. The mixture was then neutralized to pH 7.5 with a 10% solution of hydrochloric acid. The cooling bath was put back under the resin kettle and the dough was cooled to about 40 degree C. The viscous dough was precipitated into methanol contained in a Waring Blender. Absorbency of the isolated precipitates was recorded as shown in the TABLE 1.

TABLE 1

| Natural Material | Absorbency (g water/g product) |
| --- | --- |
| Tapioca Flour | 300–400 |
| Corn Meal | 300–400 |
| Peeled Yucca Root | 200–300 |
| Unpeeled Yucca Root | 200–300 |
| Oat Flour | 300–400 |
| Banana Flour | 200–300 |
| Wheat Flour | 500–600 |

EXAMPLE 2

Cornstarch was graft polymerized with acrylonitrile (AN) as a monomer and with ceric ammonium nitrate (Ce) as reported in EXAMPLE 1. For each 110 grams of cornstarch used 1400 ml of distilled water was used. For the saponification caustic, either potassium hydroxide or sodium hydroxide was used (see TABLE 2 for amounts of caustic). The absorbency of the isolated products was measured by taking one gram of dried polymer and placing it in a beaker with a known amount of distilled water in it. The polymer was allowed to free swell for 30 minutes. The unabsorbed water, if any, was decanted and the volume of the absorbent water was measured. (See TABLE 2)

TABLE 2

| Starch | AN | Ce | K | Na | Absorbency |
| --- | --- | --- | --- | --- | --- |
| Cornstarch | 115 | 5.5 | 75 |  | 400–500 |
| Cornstarch | 115 | 5.5 |  | 75 | 400–500 |
| Cornstarch | 135 | 5.5 | 90 |  | 500–600 |
| Cornstarch | 135 | 5.5 |  | 90 | 500–600 |
| Cornstarch | 115 | 5.5 | 90 |  | 400–500 |
| Cornstarch | 115 | 5.5 |  | 90 | 400–500 |
| Cornstarch | 115 | 5.5 | 90 |  | 400–500 |
| Cornstarch | 115 | 5.5 | 90 |  | 400–500 |
| Cornstarch | 115 | 5.5 | 90 |  | 400–500 |
| Cornstarch | 115 | 5.5 | 90 |  | 400–500 |
| Cornstarch | 115 | 5.5 | 90 |  | 400–500 |
| Cornstarch | 115 | 5.5 | 90 |  | 400–500 |
| Cornstarch | 150 | 6.0 | 120 |  | 500–600 |
| Cornstarch | 150 | 6.0 | 120 |  | 500–600 |
| Cornstarch | 150 | 6.0 |  | 120 | 600–700 |
| Cornstarch | 150 | 6.0 |  | 120 | 500–600 |
| Cornstarch | 150 | 6.0 |  | 120 | 500–600 |

Note:
all amounts shown are in grams

EXAMPLE 3

Pilot scale runs were made in a 100 cubic foot ribbon blender. The ribbon blender was charged with 4000 pounds of water and 342 pounds of cornstarch was added. The mixture was then heated to 95 degree C. to gelatinize the starch. After about 30 minutes the heated gelatinized starch was cooled to about 25 degree C. and 345 pounds of acrylonitrile was added with agitation. After a homogenized mixture was achieved, 7.8 pounds of ceric ammonium nitrate dissolved in 140 pounds of 0.1 N nitric acid was added as stirring continued. After 30 minutes, 445 pounds of commercial potassium hydroxide was added and steam was applied to heat the reaction mass to 95-degree C. This reaction mass was held at this temperature for approximately 1 hour. The thick viscous dough-like material was later isolated as an absorbent polymer by several procedures:

a. To recover a crude material the dough-like mass was neutralized to a pH of 6.5 to 8.5 and then fed on a heated drum dryer to provide crude flakes of absorbent polymer. Since all the extraneous salts are contained in the flakes, the absorbency of the flakes is about 200 times in distilled water.

b. To recover a fine particle size of refined absorbent particles; methanol was slowly added to the neutralized dough-like material until a smooth dispersion was achieved. The resulting dispersion was then fed slowly into a Waring Blender. The material formed fine particles and the methanol was decanted. The fine particles were collected and again placed into a Waring Blender with fresh clean methanol and again washed to remove extraneous salts. The particles were again decanted or filtered. The fine particles were collected, dried and sieved through a series of wire mesh screens to provide different particle sizes as shown in TABLE 3, NP. Since the particles are rather fine, we can pelletize them into larger particles.

c. In order to obtain a greater yield of particles of absorbent polymer in the 8 to 25 mesh ranges the dough-like mass was treated in a different way. Approximately 100 pounds of neutralized mass was added to a 20 gallon stainless steel bowl and was wetted with a small amount of methanol (one to two pounds of methanol per pound of dough) and then chopped with scissors or shears into large pieces of dough. These pieces of dough ranged in size from one half inch to 2 inches in diameter. The methanol-wetted pieces did not adhere to each other unlike pieces of dough that were not methanol wet. The pieces of methanol-wetted dough were fed into a 55-gallon stainless steel open top tank that was agitated with a Cowles Disperser. The stainless steel tank contained 25 gallons to 30 gallons of methanol, approximately 1.5 gallons of methanol per 5 pounds of neutralized dough. The Cowles Disperser was operated at high speed. The pieces of dough broke up further to yield large particles of granule absorbent particles. The methanol was decanted and an additional 0.5 to 1 gallon of methanol per 5 pounds of dough was added to the tank while agitated with the Cowles Disperser. The resulting particles after decanting the methanol were hard to the touch. The particles were filtered and dried in a vacuum oven until a 10% moisture level was reached. The dried particles were screened through a series of wire meshes to provide distributions as shown in TABLE 3, MCM.

d. Since the dough-like saponificate gave larger absorbent particles after the saponificate mass was cut into smaller pieces, the dough was formed into rods or spaghetti strands before using methanol. The neutralized saponificate was forced through dies with holes from 1/16 inch to 1/4 inch in diameter that were round-shaped or star-shaped. The dough was forced through these dies by hand-operated plungers, screw fed systems or an augur to convey the dough out the die plates. The extruded dough was formed and immediately placed into methanol, which prevented the forms from sticking back together. The forms were then agitated while in methanol, then filtered and dried to a 10% moisture level. The dried particles were then screened through a series of wire meshes. The particle size distribution of the forms is shown in TABLE 3, EP.

e. A moyno pump was used with a variable speed drive to pump the neutralized saponificate through a plastic pipe with a fixed end cap in which 1/8-inch holes were drilled. The end cap had 50 of the 1/8-inch holes drilled into it. The end cap was placed several inches above a methanol precipitation tank containing 50 gallons of agitated methanol. Spaghetti strands were formed when the saponificate was pumped through the pipe and out the end cap die plate. The pump was run at a speed that did not over pressurize the pipe and cause the spaghetti strands to swell after forming. The formed spaghetti strands were sheared off the end cap by the force of the methanol being agitated. The forms broke up further in the agitated methanol. The methanol was decanted and additional washing with fresh methanol was done. The resulting particles were filtered and dried to a 10% moisture level. The particles were then mesh screened to provide about 85% of the particles in the target range of 8 to 25 mesh ranges, TABLE 3, MP.

TABLE 3

| Precipitation Technique | >8 mesh | 8 to 25 mesh | 25 to 60 mesh | 60 to 100 mesh | >100 mesh |
| --- | --- | --- | --- | --- | --- |
| Normal Precipitation (NP) | 0% | 4% | 21% | 44% | 31% |
| Methanol chopped method (MCM) | 8% | 65% | 15% | 12% | <1% |
| Extruded Precipitation (EP) 1/8" holes | <1% | 84% | 11% | 5% | <1% |
| Extruded Precipitation (EP) 1/16" holes | <1% | 9% | 73% | 16% | 2% |
| Extruded Precipitation (EP) 1/4" holes | 23% | 61% | 14% | <1% | <1% |
| Moyno Pump (MP) 1/8" holes | | 85% | 12% | 3% | <1% |

EXAMPLE 4

A 3-liter resin kettle was charged with 700 grams of distilled water and 70 grams of cornstarch was added with stirring. The stirrer was a double helix design but other stirrer designs could be used. Nitrogen was bubbled through the stirred starch dispersion. The dispersion was then heated to 88–91 degrees C. and held for at least 30 minutes. After heating the gelatinized starch dispersion, it was cooled to 25–35 degrees C. by replacing the heating mantle with a cooled water/ice bucket. The cooled dispersion was treated with 96 grams of acrylonitrile and stirring was continued for 10 minutes. Then 3.8 grams of ceric ammonium nitrate dissolved in 10–20 ml of water. (The ceric ammonium nitrate solution could be made with a nitric acid solution as well). The ceric ammonium nitrate solution was charged into the starch-acrylonitrile mixture in the resin kettle immersed in the cooling bucket. The mixture was agitated for about 45 minutes as the graft polymerization reaction takes place. After the graft reaction ran to completion, the resin kettle with the graft polymer was placed in a heating mantle. One liter of water containing 45.8 grams of sodium hydroxide was added over a 15-minute period while stirring and heating was going on. The system was heated to 90–95 degrees C. and held at that temperature for 60 minutes. Ammonia gas was liberated during the final 20 minutes of this saponification reaction, and could be removed and recovered with vacuum. The saponification is cooled to ambient temperature and the pH is adjusted to 2.0–3.2 with the addition of a 10% hydrochloric acid solution. Other acids could be used to adjust the pH to the acid level. At this low pH the acid form of the starch-g-polyacrylonitrile saponified polymer becomes insoluble and settles as a precipitant in the resin kettle. Upon settling, filtering or centrifuging the acid form is separated from most all of the neutralization salts. Additional water washing of the precipitant removes more of these neutralization salts until the acidified saponified polymer is mostly "salt free". The lower the neutralization salt content in this acidified saponified polymer the higher the final absorbency of the potassium or sodium carboxylate form of the starch graft copolymer. The solid content of this acidified saponified polymer after centrifugation is about 15%. If higher solids are desired further dewatering steps must be done. This can be achieved by drying the acidified polymer to a moisture level of 1% to 20% or by washing the acidified starch graft copolymer with a dewatering agent such as methanol. The acid saponified polymer was then pH adjusted with potassium hydroxide to a pH of 6 to 8. This treatment converts all of the acid carboxylate groups to the potassium salt form. A food extruder, the Ron Popeli Pasta maker, was used to extrude rods or spaghetti strands. The thickened potassium salt form of the graft polymer was extruded into small rods. If the rods stick together they can be dusted with additional starch or clays or wetted with methanol, which keeps the rods from sticking together. The rods were then dried in a forced air oven or vacuum oven to moisture content of about 12%. When dry, the rods were ground to a particle size of 8 to 25 mesh for agricultural evaluation. Particles that were finer than 25 mesh can be formed into pellets to yield additional product in the 8 to 25 mesh size range. Evaluation of the absorbency of the dried potassium starch graft polymer was about 1200 times its weight in distilled water.

EXAMPLE 5

Sample of the 8 to 25 mesh particles from EXAMPLE 3, MCM, was provided to an agricultural company for testing on cantaloupe, tomatoes, and cotton.

a. For testing on cantaloupe, the trial area was pre-irrigated and the seed was planted to moisture. The 8 to 25 mesh absorbent was applied in-furrow with the seed using a microband ground driven granule applicator. At 18 days after planting there was a significant increase in the weight of the plants in the 7-pound per acre rate when compared to the plants in the untreated check group. The leaf water potential in the absorbent treated plants showed a 3 bar improvement over the check group at 18 days. The plants in the 7-pound per acre rate had a greater root and plant weight, larger stem diameter, and increased plant height when evaluated at 25 days after planting when compared to the untreated control group. The plants in the 7-pound per acre group started blooming 3 days before the untreated check group and the crown set were also greater. Weight of the final melon crop was substantially greater in the absorbent treated group when compared to the untreated check group. The trial area received approximately half the amount of water during the growing period that would have normally been used to grow a crop of melons.

b. For testing on tomatoes, two different treatments with the absorbent polymer particles. (see EXAMPLE 3, MCM)

In first treatment the absorbent polymer particles were placed about 2 inches below the tomato seeds to evaluate the growth response under drought conditions. In the second treatment the absorbent polymer particles were placed on the soil surface prior to the planter press wheel due to soil crusting from the sprinkler irrigation. Tomato stand counts made 7 days after planting revealed a significant increase in the number of plants per ten foot of row compared to the untreated check row. The larger number of plants in the absorbent polymer treated rows documents their ability to provide anti-crusting properties. In the untreated check and in the first treatment where the absorbent was placed two inches below the seed, a crust formed on the soil surface restricting tomato emergence. All plots were then sprinkled with enough water to break the crust allowing the tomatoes to emerge. Total plant weight (tops and roots) were greatly improved on the plot where the absorbent particles were placed two inches below the seed when compared to the untreated control check and the surface applied treatment of absorbent polymer particles.

c. For a test on cotton, 7 pounds of absorbent particles per acre was placed in-furrow with the cottonseed. The three evaluations were conducted during the first part of the growing season. The evaluations were done at 11, 18 and 25 days. The cotton showed better growth in plant height, total plant weight and root development. Cotton plants with the 7 pound per acre application rate received only one half the normal amount of water. These plants were larger than the control group. At harvest the cotton lint yield from the absorbent treated plot yielded 10% more than the control group and received 50% less water than the control group.

EXAMPLE 6

Samples of the 8 to 25 mesh particles made from the ⅛ inch extruded product (EXAMPLE 3, EP) were provided to an agricultural company for testing on tomatoes and cotton.

a) For tomatoes, rates of absorbent varied. Rates of 1, 2 and 4 pounds per acre were applied over the seed row prior to the press wheel. Also absorbent was applied 2 inches below the tomato seeds at rates of 3, 7 and 10 pounds per acre. There was a significant improvement in tomato plant stands per plot with all of the absorbent treatments when compared to the untreated control group documenting anticrusting properties of the starch graft copolymer. The absorbent applied under the seed was better in total plant growth to that applied over the soil surface or to the untreated control group. Five individual plants were picked at random from each plot as well as a random 20 feet of each row. There was a significant increase in tomato yield with all the absorbent treatments compared to the untreated control group. The higher rate of 4 pounds per acre (4 lbs/acre) resulted in the greatest tomato yield when compared to the untreated control group or the other plots with lower rates of absorbent addition. At 4 lbs./acre tomato yield was 38.7 tons per acre compared to 15 tons per acre for the control. At 7 lbs./acre tomato yield was 39.3 tons per acre compared to 15 tons per acre for the control.

EXAMPLE 7

The absorbent from EXAMPLE 3, MCM, was evaluated on several seed crops to determine the absorbent's activity and the absorbent's phytotoxicity. The absorbent was applied at levels of 4 pounds in the furrow or in a 3-inch band over the row. Also, levels of 7 pounds in the furrow or in a 3-inch band over the row were evaluated. Soil types were loamy sand or loam. Smaller seeds were planted at a ½ inch depth and larger seeds at a 1-inch depth. Percent emergence was evaluated at 3, 5, 7, 10 and 14 days after planting. Seeds evaluated were:

List of Seeds:

| | | | | |
|---|---|---|---|---|
| Bean (dry) | Cantaloupe | Oat | Pumpkin | Turnip |
| Barley | Fine fescue | Onion | Radish | Watermelon |
| Broccoli | Tall fescue | Pea (dry) | Rye Grass | Wheat |
| Coreopsis | Garlic | Honeydew | Sorghum | Asparagus |
| Canola | Wild rye | Parsley | Sun Flower | White Clover |
| Carrot | Kentucky Bluegrass | Bell Pepper | Spinach | Soybean |
| Cauliflower | Lentil | Coreander | Squash | Alfalfa |
| Cotton | Dill | Elymus Glaucus | Sugar Beet | Tomato |
| Celery | Lettuce leaf | Field corn | Sweet Corn | |
| Cucumber | Lima Bean | Zinnia | Swiss Chard | |

Emergence varied with the seeds. Interestingly, no phytotoxicity was observed with any of the seeds shown. This demonstrated good activity between the seed and the absorbent.

It is to be understood that the foregoing detailed description of the invention is given by way of illustration and that modification and variations may be made therein without departing from the spirit and scope of the invention.

We claim:

1. A method of producing a starch graft copolymer for use in agricultural applications, comprising the steps of:
   providing grafting reactants and a starch;
   graft polymerizing said grafting reactants onto said starch to form a starch graft copolymer;
   saponifying said starch graft copolymer;
   precipitating said starch graft copolymer;
   granularizing said starch graft copolymer to form particles; and
   wherein said precipitating step further comprises the step of forming said starch graft copolymer into a plurality of rod-shaped particles.

2. The method as in claim 1, wherein said precipitating step further comprises placing said plurality of rod-shaped particles into an alcohol.

3. The method as in claim 2, wherein said alcohol comprises methanol.

4. The method as in claim 1, wherein said precipitating step further comprises the step of drying said plurality of rod-shaped particles.

5. The method as in claim 4, wherein said drying said plurality of rod-shaped particles comprises air-drying.

6. A starch graft polymer for use in agricultural applications made in accordance with the process of claim 1.

* * * * *